Aug. 11, 1953　　　C. A. GARRETT　　　2,648,076
STINGLESS BEEHIVE
Filed Aug. 14, 1951　　　　　　　　　　　2 Sheets-Sheet 1

INVENTOR
CHARLEY A. GARRETT,

BY
McMorrow, Berman & Davidson
ATTORNEYS

Aug. 11, 1953     C. A. GARRETT     2,648,076
STINGLESS BEEHIVE
Filed Aug. 14, 1951                                      2 Sheets-Sheet 2
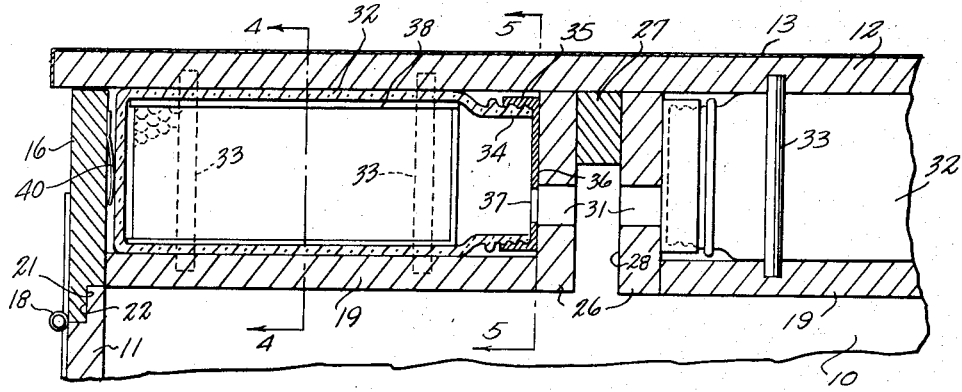
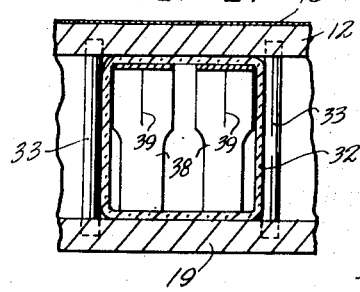 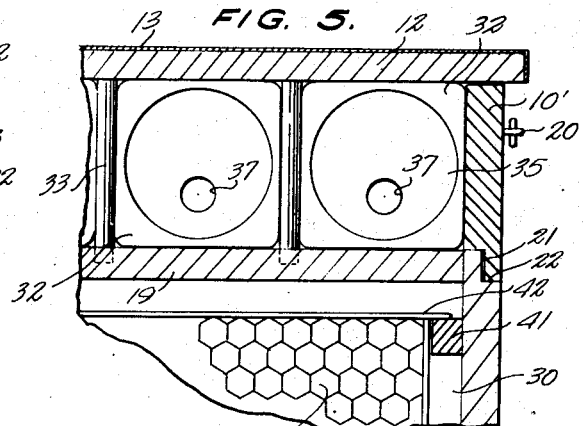
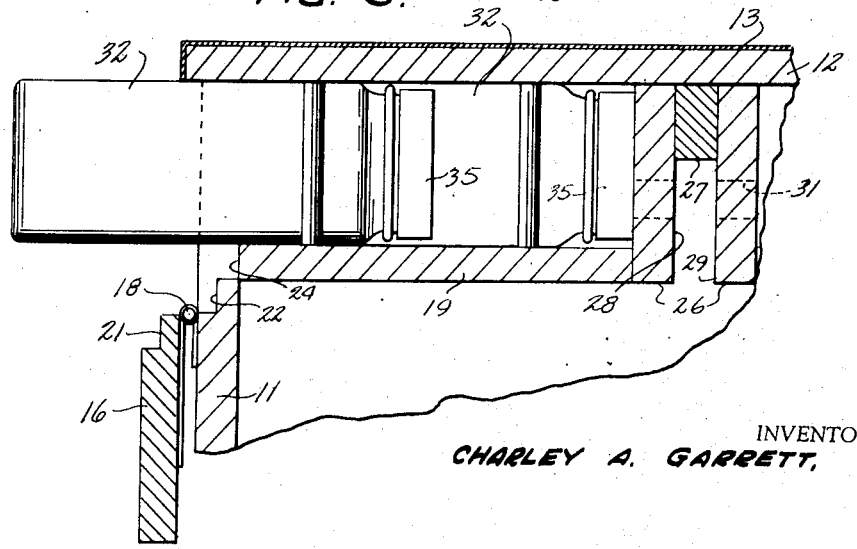
INVENTOR
CHARLEY A. GARRETT,
BY
McMorrow, Berman & Davidson
ATTORNEYS Patented Aug. 11, 1953

2,648,076

UNITED STATES PATENT OFFICE 2,648,076

STINGLESS BEEHIVE

Charley A. Garrett, Gainesville, Tex.

Application August 14, 1951, Serial No. 241,777

2 Claims. (Cl. 6—2)

This invention relates to an improved stingless beehive, and the primary object of the invention is to provide a more efficient and practical beehive of this character which the keeper can "rob" without danger of being stung by bees and without disturbing the working of the bees, and wherein waste of unfilled combs is eliminated by making them visible for inspection before removal from the beehive.

Another important object of the invention is to provide a more simply constructed and more easily serviced beehive of the character indicated above which employs transparent jars for the secondary or honey hives wherein the jars have covers or lids with holes therein which are used on the jars while in the beehive and through whose holes the bees travel from the main hive, and imperforate lids or covers with which the perforated covers or lids are replaced upon removal of the jars from the beehive so as to make the jars ready for market without additional operations.

Other important objects and advantageous features of the invention will be apparent from the following description and the accompanying drawings, wherein, for present purposes of illustration only, a specific embodiment of the invention is set forth in detail.

In the drawings:

Figure 3 is an enlarged fragmentary transverse vertical section taken on the line 3—3 of Figure 1.

Figure 1:
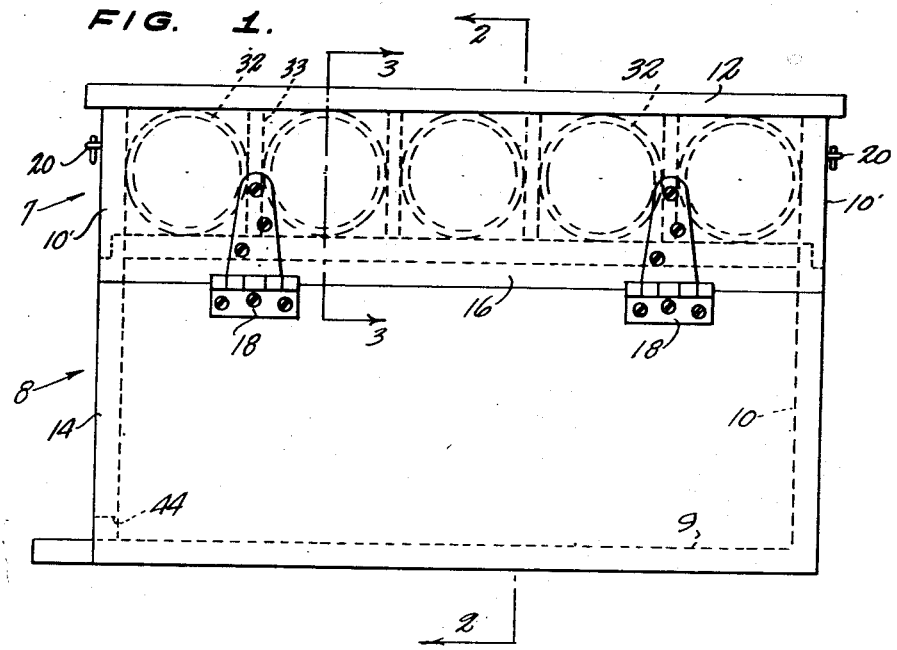
Figure 1 is a side elevation.

Figures 4 and 5 are enlarged fragmentary transverse vertical sections taken on the lines 4—4 and 5—5 of Figure 3; and, Figure 6 is a view similar to Figure 3 but showing one of the doors in open position and a jar partially removed from the beehive.

Referring in detail to the drawings, wherein like numerals designate like parts throughout the several views, the illustrated beehive is of generally rectangular box form, being composed of a removable top section 7 resting upon a bottom section 8. The bottom section 9 comprises a bottom wall 9 from which rise end walls 10 and side walls 11. On the upper ends of the end walls 10 rest the end walls 10' of the top 7 which does not have side walls. A top wall 12 is secured on the upper edges of the top end walls 10'. The top wall 12 is preferably overlaid by a metal sheath 13. The vertical corners of the lower section 8 formed by the meeting of the side walls and end walls are overlaid by metal bindings 14.

Figure 2:
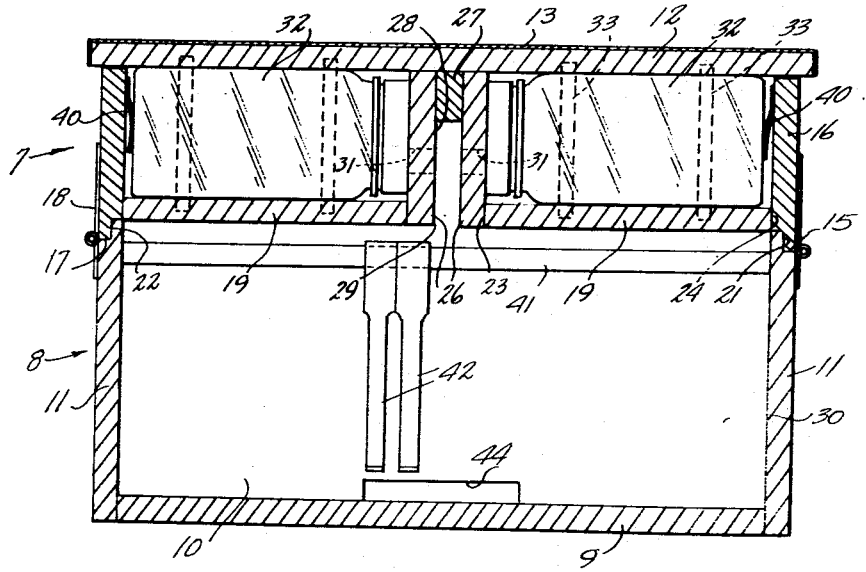
Figure 2 is a transverse vertical section taken on the line 2—2 of Figure 1.

The side walls 11 have upper edges 15 which are downwardly spaced from the top wall 12 of the top section 7 and from the upper ends of the end walls 10 to provide openings affording access to the interior of the upper section 7 of the beehive. Longitudinally elongated doors 16 are provided for the access openings, the lower edges 17 of the doors being mounted by outside hinges 18 to come into abutment with the upper edges 15 of the side walls 11 when the doors are in closed position, as shown in Figures 1, 2 and 3. Hook and eye arrangements 20 which act between the opposite ends of the doors 16 and the related end walls 10' of the top section 7 provide for securing the doors in closed position and securing the top section 7 in place on the lower housing section 8. As shown in Figures 1 to 3, the upper edges of the side walls 11 and the lower edges of the doors 16 are rabbetted at 21 and 22, respectively, to provide an overlapping joint when the doors are closed and to prevent shifting of the top section 7 relative to the bottom section 8.

On a level flush with the upper edges 15 of the side walls 11 and extending the length of the beehive, the top section 7 has floors or floor plates 19 which are secured to the end walls 10' and have laterally inward edges 23 which are in spaced relation to each other and laterally outward edges 24 which are flush with the laterally inward sides of the side walls 11 so as to be abutted by the doors 16 in their closed positions. Secured to the edges 23 of the floor plates adjacent the space between the floor plates 19 are vertical longitudinal partition walls or plates 26 which reach to the top wall 12 and are secured at their ends to the end walls 10'. A spacer strip 27 is secured between the upper portions of the partitions 26 to space them and define an aisle or passageway 28 between the partitions which is open at its lower end, as indicated at 29, so as to be in communication with the main hive chamber 30 in the lower housing section 8 beneath the floor plates 19.

The partition walls 26 are formed with equally longitudinally spaced holes 31 through the lower part thereof which provide communication between the passageway 28 and the laterally outward sides of the partitions 26 above the floor plates 22. The spaces between the top 12, partition walls 26 and floor plates along opposite sides of the beehive are taken up by the square cross section transparent jars 32 which are separated for easy removal by transversely aligned and spaced vertical guide elements in the form of dowels 33, secured at their upper and lower ends in the top 12 and floor plates 22, as shown in the drawings. The jars 32 have reduced cylindrical threaded necks 34 on which are adapted to be secured caps, constituting lids or covers for the jars. The caps include caps (not shown) having imperforate webs and caps 35 having webs 36 imperforate except for single holes 37 which are adapted to be registered with the holes 31 in the partition walls 26, as shown in Figure 3, to provide for movement of the bees (not shown) from the main hive chamber 30, through the passageway 28, and the holes 31 and 37 into the jars 32. In the jars 32 are placed pairs of frames 38 having starter combs 39. The laterally inward sides of the doors 16 are provided with depending leaf springs 40 arranged to bear against the outward ends of the jars 32 to hold their inward capped ends tensioned in engagement with the partition walls 26 when the doors are in closed position and secured by the hook and eye devices 20. When the doors are in open position the jars 32 can be readily pulled partly or wholly out of place to enable visually determining whether they are full, and either removed or replaced. When a full jar is removed the perforated cap 35 is replaced with an imperforate cap and the jar is ready for shipment to market without any additional operations.

In the main hive chamber 30 are transverse cleats 41 secured to the upper part of the end walls 10, upon which frames 42 are adapted to be removably suspended containing beeswax starter foundations 43. Access from outside of the beehive to the main hive chamber 30 is afforded by a horizontally elongated slot 44 formed in a side wall 11 at the level of the bottom 9; and access to the chamber 30 for placing and replacing the frames 42 is had by disconnecting the hook and eye devices 20 and lifting the upper housing section 7 off the lower housing section 8.

What is claimed is:

1. In a beehive, a lower container section including spaced upstanding side walls, a door superimposed upon each of said upstanding side walls in vertical aligned relation therewith and hingedly connected to the adjacent side wall for swinging movement from the vertical aligned position to a position away from the vertical aligned position, an upper section superimposed upon and connected to said lower section, said upper section including a top wall, spaced depending end walls secured to said top wall, a pair of floors arranged in spaced side by side relation positioned between and connected to said depending end walls, the space between said floors being in communication with the interior of said lower section, said doors of said lower section bridging the spaces between said floors and said top and forming the side walls of said upper section, and an upstanding partition positioned longitudinally of each of said floors adjacent the space between said floors and fixedly secured to the top wall and to the adjacent floor, the partitions together forming a longitudinally extending passageway in communication with the space between said floors, each of said partitions being provided with longitudinally spaced holes extending therethrough, a plurality of transparent jars each including an open end and a closed end arranged in side by side spaced relation and positioned transversely of each of said partitions and supported intermediate their ends on said floors, each of said jars having a removable cap including a web bridging the open end thereof, the web of each cap being provided with a hole in registry with the corresponding hole in the respective partition, and spring means carried by each of said doors and engageable with the closed end of each of said jars to maintain the open end of each jar in abutting relation with respect to the corresponding partition.

2. In a beehive, a lower container section including spaced upstanding side walls, a door superimposed upon each of said upstanding side walls in vertical aligned relation therewith and hingedly connected to the adjacent side wall for swinging movement from the vertical aligned position to a position away from the vertical aligned position, an upper section superimposed upon and connected to said lower section, said upper section including a top wall, spaced depending end walls secured to said top wall, a pair of floors arranged in spaced side by side relation positioned between and connected to said depending end walls, the space between said floors being in communication with the interior of said lower section, said doors of said lower section bridging the spaces between said floors and said top and forming the side walls of said upper section, and an upstanding partition positioned longitudinally of each of said floors adjacent the space between said floors and fixedly secured to the top wall and to the adjacent floor, the partitions together forming a longitudinally extending passageway in communication with the space between said floors, each of said partitions being provided with longitudinally spaced holes extending therethrough, a plurality of transparent jars each including an open end and a closed end arranged in side by side spaced relation and positioned transversely of each of said partitions and supported intermediate their ends on said floors, each of said jars having a removable cap including a web bridging the open end thereof, the web of each cap being provided with a hole in registry with the corresponding hole in the respective partition, spring means carried by each of said doors and engageable with the closed end of each of said jars to maintain the open end of each jar in abutting relation with respect to the corresponding partition, and a guide element interposed in the space between each of said jars and fixedly secured to said top wall and the adjacent floor.

CHARLEY A. GARRETT.

References Cited in the file of this patent

UNITED STATES PATENTS

| Number | Name | Date |
|---|---|---|
| 62,425 | Keith | Feb. 26, 1867 |
| 176,347 | Perrine | Apr. 18, 1876 |
| 808,144 | Dempsey | Dec. 26, 1905 |
| 1,073,458 | Anderson | Sept. 16, 1913 |
| 1,073,459 | Anderson | Sept. 16, 1913 |
| 1,146,044 | Wood | July 13, 1915 |
| 1,417,623 | Massie | May 30, 1922 |